INVENTOR
ROBERT R. THOMPSON
JAMES C. CUMMING

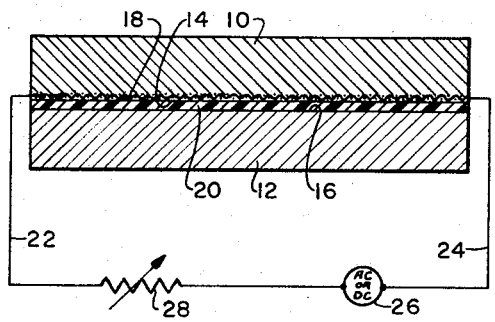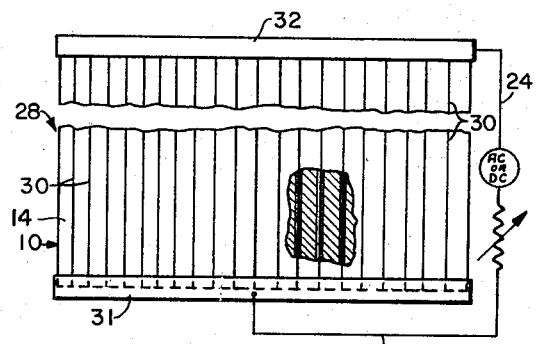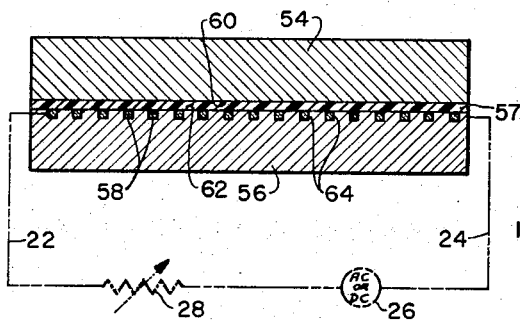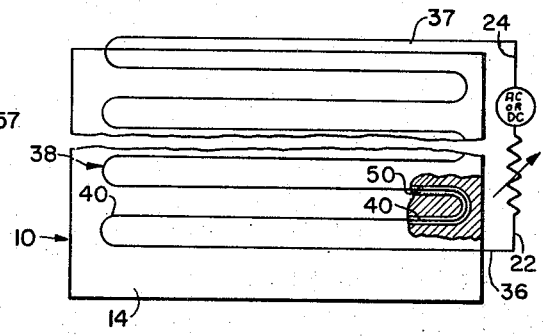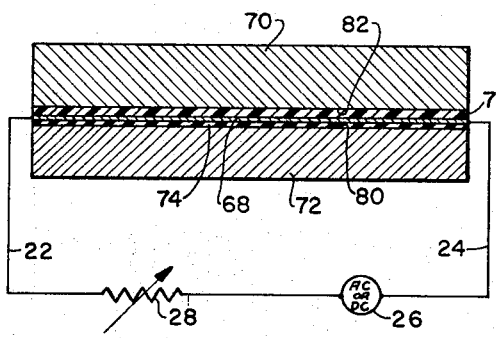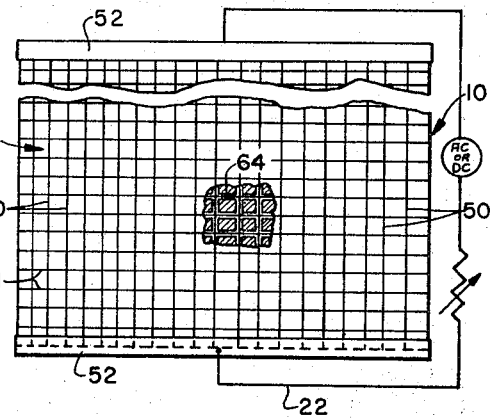
INVENTOR
ROBERT R. THOMPSON
JAMES C. CUMMING
ATTORNEY Oct. 24, 1967    R. R. THOMPSON ET AL    3,348,640
LAMINATED ARTICLES AND METHODS OF BONDING
AND DEBONDING THEREFOR

ATTORNEY

United States Patent Office 3,348,640
Patented Oct. 24, 1967

3,348,640
LAMINATED ARTICLES AND METHODS OF
BONDING AND DEBONDING THEREFOR
Robert R. Thompson, Livonia, and James C. Cumming, Pleasant Ridge, Mich., assignors to Rockwell-Standard Corporation, Pittsburgh, Pa., a corporation of Delaware
Filed Oct. 29, 1964, Ser. No. 407,303
5 Claims. (Cl. 188—250)

The present invention relates generally to methods of making laminated articles and to such articles having layers of similar or dissimilar materials securely joined by thermosetting adhesive bonding agents. More specifically this invention relates to novel methods for bonding brake linings to brake shoes and for debonding used linings therefrom.

It is well-known to form laminated articles from similar or dissimilar members by applying an adhesive, such as a thermo-setting resin of the polymer group between the adjoining surfaces of the members. Controlled application of heat cures the adhesive and securely bonds the members together. External pressure may also be applied to the members simultaneously with the heat to insure proper bonding thereof.

One of such prior methods is disclosed in Patent No. 2,520,978, to R. K. Super wherein an induction heating process is employed to induce current flow in one of the members to be bonded for elevating its temperature so that a thermo-setting adhesive bonding material between the members is cured. This process is only feasible when one of the members to be bonded is electrically conductive and requires the use of induction coils and a high frequency generator which can be expensive and bulky. In addition, temperature control is difficult in such processes and extreme care must be taken against overheating which may adversely affect the physical properties of the members to be joined.

It has also been proposed prior to the present invention to provide means for localized heat application directly at the surfaces to be joined to: (1) reduce heating time; (2) reduce the amount of heat required; and (3) prevent overheating of the adjoining members. These prior art means consist of wires, metal foils, or other material which can be used as resistance heating elements embedded in the adhesive between the members to be joined.

This type of process is exemplified by Patent No. 2,742,390 to R. D. Beck. The adhesive material used in such processes is usually prefabricated in the form of a sheet or tape of thermo-setting adhesive material having metallic inserts which act as resistance elements. The sheet or tape is inserted between the members to be bonded and an electric current is applied to the resistance elements embedded therein to generate heat, thereby curing the thermo-setting adhesive to form a bond. When pressure is applied to the members being bonded, the resistance elements frequently may be damaged due to the sandwiching effect of the two members being bonded, rendering the elements inoperable for further use. Furthermore, the resistance element must remain in the adhesive between the members after the bonding operation is finished because its removal would destroy the lamination. Bonds of this type are not entirely satisfactory and normally fail completely in applications in which the laminated parts are subjected to high bending and shearing stresses, because the resistance element is embedded in the cured adhesive and thus has the effect of a spacer between the adjoining bonded surfaces which weakens the adhesive layer.

The effective bonding area in such prior art laminations is reduced in an amount equal to the area of the surface contact between the bonded members and the resistance element. Furthermore, the layer of adhesive in these laminations between the interfaces of the bonded members is not uniform but instead is interrupted by the resistance element. Even when the resistance element is completely coated with the adhesive, the weakest points of adherence occur where the resistance element contacts the interfaces of the bonded members causing the bond to rupture under bending or shearing stress.

It is accordingly a principal object of the present invention to provide novel methods for thermally activating an adhesive to bond members of similar or dissimilar material together without overheating the members and at the same time to provide uniform uninterrupted contact between the members and the adhesive at the bonded region.

Another object is to provide a novel method of forming a bonded assembly having an electrical resistance element positioned in a manner that prevents damage to the element when pressure is applied in a direction normal to the bonded region.

It is a further object of the present invention to provide novel methods of bonding two members together in which a resistance element is permanently recessed or embedded in the surface of one of the members to be bonded and is substantially flush with the surface of the member for effective curing of an adhesive material layer immediately adjacent the surface of the member without weakening of the adhesive material layer.

Still another object is to provide a bonded assembly having a novel electrical resistance heating means integral with a surface of one of the two members to be bonded for localized electrical heating of a thermo-setting adhesive placed between the adjoining surfaces of the members to thereby cure the adhesive without affecting the properties of the members.

A more specific object of the present invention is to provide a novel method for bonding a brake lining to a brake shoe in which the adhesive between the brake lining and brake shoe is heated by electrical resistance means integral with the brake shoe.

Another more specific object is to provide a novel method of debonding worn brake linings from brake shoes by resistance heating the adhesive layer between the lining and the shoe beyond a temperature at which the strength of the adhesive is sufficiently reduced to permit the worn lining to be easily separated from the brake shoe.

Still another more specific object is to provide a novel brake shoe or brake lining provided with grooves in one surface in which are positioned electrical resistance heating wires for the purpose of thermally activating a bonding adhesive in contact with the surface.

An additional object of the present invention is to provide a brake shoe having a brake lining supporting and attaching surface to which is integrally attached a thin film of resistive material which is electrically conductive and acts as a resistance heating element for the purpose of thermally activating a thermo-setting adhesive applied between the shoe and the brake lining.

These and other novel features of the present invention will become more fully apparent from the claims and the following detailed description as it proceeds in connection with the attached drawings wherein:

FIGURE 1 is a transverse section of a bonded assembly in accordance with the present invention in combination with a source of electrical energy;

FIGURE 2 is a transverse section of another embodiment of the bonded assembly;

FIGURE 3 is a transverse section of still another embodiment of the novel bonded assembly;

FIGURES 4–6 are plan views partly in section showing various exemplary embodiments of wire conductors which may be used in the present invention;

Figure 7:
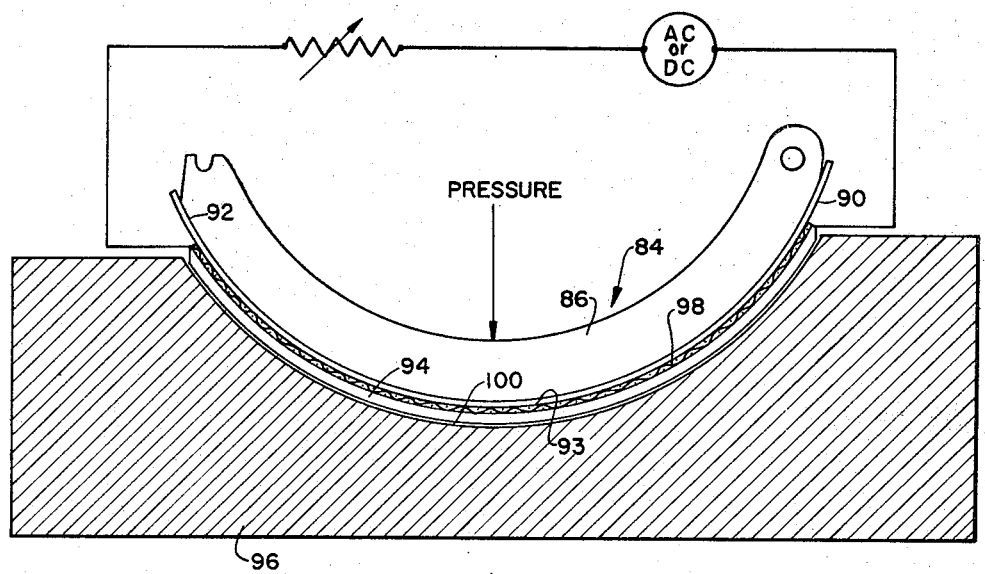
FIGURE 7 illustrates schematically an apparatus to bond brake linings to brake shoes in accordance with the novel method of the present invention.

Referring now to the drawings, FIGURE 1 shows an assembly for bonding two members 10 and 12 which may be of similar or dissimilar composition and may have any configuration providing only that their two adjacent surfaces 14 and 16 respectively are co-planar and substantially smooth to tightly fit upon each other. The first member 10 has an electrical resistance element 18 embedded in one surface 14 and the second member 12 is separated by an adhesive layer 20 from member 10.

Resistance element 18 may be a thin gage wire of steel, Chromel or the like and is embedded in member 10 such that the surface of the wire is either flush or at a predetermined depth below surface 14.

To bond members 10 and 12 together, layer 20 of thermo-setting adhesive as applied to either surface 14 or 16 and members 10 and 12 are pressed together with adhesive layer 20 sandwiched between them. Layer 20 may be any suitable type of commercially available phenol formaldehyde condensation product thermo-setting adhesive containing a catalyst. These products are heat curable from a pasty condition to a solid condition in which they tightly adhere to any surface to which they are applied. By heating to a sufficient temperature beyond the curing temperature, the shear strength of the adhesive can be reduced to zero.

To accomplish bonding between members 10 and 12 the adhesive is electrically heated to its curing temperature by the following means: resistance element 18 is connected by its opposite ends, which extend outwardly of the member 10 to lead wires 22 and 24 respectively connecting element 18 to a source of electrical energy 26. The heat input into element 18 may be varied to suit the particular application by means of a variable resistor 28 in series with the element. By impressing a voltage of sufficient magnitude between the ends of resistance element 18, adhesive 20 is rapidly heated to its curing temperature to form a firm bond between members 10 and 12 with the adhesive adhering to both surfaces 14 and 16. To further the rigidity of the bond and to prevent any air pockets from forming therein pressure may be applied to members 10 and 12 in a direction normal to the bond area. After the curing period, which is of relatively short duration, the ends of resistance element 18 are disconnected from lines 22 and 24 to interrupt the electric current. The ends of element 18 may then be cut flush with the surface or may be left exposedly projecting from the surface depending upon the intended use of the lamination.

By this method a durable, tight bond is formed between the surfaces 14 and 16, by a continuous adhesive layer of uniform density and thickness because the resistance element is recessed within member 10.

It is also possible to separate members 10 and 12 from each other by severing the bond between them. This is accomplished by impressing a sufficient voltage between the ends of element 18 to heat the adhesive beyond its curing temperature up to the point where its shear strength becomes zero causing the adhesive to rupture. Thereafter, when the voltage is cut off, the two parts 10 and 12 can be easily separated by applying outward, oppositely directed forces to the bonded surfaces.

The configuration of the resistance element may take any of the forms illustrated in FIGURES 4 to 6.

In the embodiment of FIGURE 4, the resistance heating element 28 is formed by rows of parallel wires 30 extending along the length of surface 14 of member 10. One end of wires 30 is connected to a contactor 31 comprising a strip of electrically conductive material connected to lead 22. The opposite ends of wires 30 are similarly connected by a strip 32 to lead 24.

In the embodiment of FIGURE 5, resistance element 38 is a single wire 40 wound in convolutions extending back and forth across the entire surface 14. The projecting end 36 of wire 40 is connected to lead 22. The other end 37 of wire 40 is connected to a lead 24 to make connection with the other end of the current source.

In the embodiment of FIGURE 6, the resistance element 48 comprises a screen 50 which spans the entire surface 14 of member 10. At both ends of the screen a contactor 52 is provided with the loose ends of screen 50 attached thereto. One edge of contactor 52 extends from the surface of member 10 and is connected to lead wire 22. The other end of screen 50 is similarly constructed to complete the circuit. The cross members 51 of screen 50 need not be conductive and may be of glass fiber or other material since they do not carry any current and do not contribute to the heating effect of the resistance element.

It is evident that other configurations of the resistance element are possible, the preference being that the element covers as much of the surface as possible and the wire strands be closely spaced to assure uniform fast heating of the adhesive.

Figure 9:
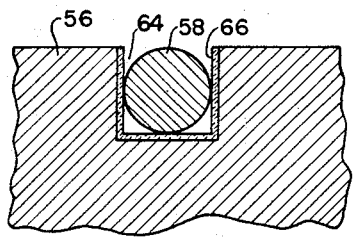
FIGURE 9 is an enlarged fragmentary cross section illustrating the embodiment of FIGURE 2 in greater detail.

With reference to FIGURES 2 and 9, FIGURE 2 illustrates a bonded assembly comprising members 54 and 56, adhesive layer 57, resistance elements 58, and a source of electrical energy 26. Members 54 and 56 may be of similar or dissimilar material having flat co-planar surfaces 60 and 62 respectively. Grooves 64 are cut or otherwise provided in one surface of either member 54 or 56 and resistance element 58 is inserted therein. Grooves 64 are preferably of a depth and width corresponding to the diameter of the electrical resistance element 58 and may be coated with an insulating material 66 (FIGURE 9) to prevent short circuiting if member 56 is electrically conductive. The electrical resistance element should preferably be flush with the surface 62 to provide a smooth bonding surface for adhesive layer 57.

FIGURE 3 represents another embodiment of the bonded assembly of this invention comprising members 70 and 72, having a thin insulating coating 74 on one of the members, an electrical resistance coating 68 on the insulating coating, and an adhesive layer 76 on coating 68.

Resistive layer 68, which may be a tin oxide, or conductive ceramic, and insulating coating 74 on surface 80 of member 72 may be applied by spraying or dipping or any well-known chemical or electrolytic coating process. Thus, electrical resistance film 68 becomes an integral part of member 72 in the form of a surface layer. Film 68 may completely cover the surface 72 or may be applied thereto in strips spaced from each other in a pattern similar to that shown in FIGURE 4.

The bonding of members 70 and 72 is accomplished by coating surface 82 of member 70 with adhesive 76, bringing both members together and impressing a voltage between the ends of resistance film 68 as described in connection with FIGURE 1 to heat the adhesive to its curing temperature.

Resistance film 68 is not destroyed when the bond is formed and may be used to sever the bond as previously described.

Since the resistive film 68 forms an integral smooth surface layer with member 72, the finished bond is uniform throughout and uninterrupted to provide a tight joint.

FIGURE 7 illustrate the application of the invention to bonding a brake lining to a brake shoe.

A brake shoe 84 having a web 86 and a table 92 having an outer surface 90 for attaching a brake lining 94 is shown in combination with a support stand 96 having a concave cavity 100 of a shape corresponding substantially to the outer convex surface of brake lining 94. Inner surface 93 of lining 94 may be provided with a resistance element 98 as described and illustrated in connection with FIGURE 1. The ends of element 98 are connected to leads which are connected to a source of AC or DC current respectively as in FIGURE 1.

To bond brake lining 94 to surface 90 of brake shoe table 92 the lining is placed in cavity 100 and a bonding adhesive is applied to the upwardly facing concave surface thereof. The adhesive may be any suitable brake bonding adhesive such as the commercially available "Cycleweld" (Registered Trademark). Then brake shoe 84 is placed upon the adhesively coated lining as shown and a voltage is impressed between the ends of element 98 to heat the adhesive to its curing temperature. Simultaneously, a pressure is applied on the brake shoe in a direction normal to the bond area as indicated by the arrow to insure even bonding of the two members by forcing air pockets from the adhesive layer.

After passage of suitable curing time, as recommended by the manufacturer of such conventional adhesives, the current is interrupted by disconnecting the outwardly extending ends of resistance element 98 from the current source. The adhesive is then allowed to cool and thereafter forms a rigid, tight and uniform bond between brake shoe 84 and lining 94 capable of withstanding relatively high shearing stresses such as occur during brake application when lining 94 is frictionally engaged. Since the bond is uniform and uninterrupted throughout due to the conductor element being recessed into one of the bonded surfaces, there are no weak sections in the bond.

It will be understood from the foregoing description in connection with FIGURES 1 to 6 that any of the conductors of FIGURES 1, 2 or 3 in any shape disclosed in FIGURES 4 to 6 may be employed in the bonding process illustrated in FIGURE 7. That is, resistance element 98 could be embedded within the surface of the lining 94 as illustrated; grooved into the brake shoe table 92 as in FIGURE 2; or either surface may be provided with a resistive film of tin oxide, conductive ceramic or the like in FIGURE 3.

The resistance element in any of the embodiments disclosed remains intact after the bond is finished for a purpose now to be described in connection with FIGURE 8.

In certain instances, and especially in brake shoe assemblies, it is sometimes necessary to sever the bond between the two bonded members without damaging at least one of the members. The present invention provides a faster and more efficient method for removing worn bonded brake linings from brake shoes. This method employs the same means used in bonding the new lining to the brake shoes.

Figure 8:
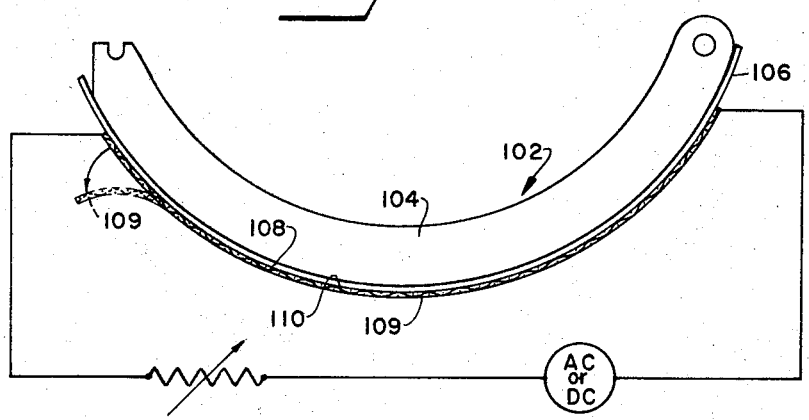
FIGURE 8 is a schematic illustration showing the debonding of worn brake linings from a brake shoe also in accordance with the novel method of this invention.

FIGURE 8 shows a brake shoe 102 composed of web 104 and lining table 106 to which a now worn lining 109 has been bonded by the method described above.

To quickly detach the worn lining 109 from brake shoe 102, a current is passed between the ends of the electrically conductive resistance element 108 which has been retained in brake shoe lining surface 110 from the bonding operation of FIGURE 7. The potential required for debonding is of such magnitude as to heat the adhesive beyond its curing temperature up to a point where the resistance of the adhesive to a shearing stress becomes substantially reduced upon which the worn lining 109 may be easily separated from shoe 102 as shown in FIGURE 8.

To further illustrate the range of possibilities of the present novel bonding method the following example of an actual application in the debonding method of FIGURE 8 is given:

Using the configuration illustrated in FIGURE 5, a 28-gage Chromel wire was positioned 0.030 inch below the brake shoe lining surface and the winding spaced apart ⅜ of an inch. With a commercial thermo-setting adhesive (in this instance "Cycleweld" K-183) the energy requirement was 0.375 kilowatt hr. to remove a 7 x 16½ inch lining from the brake shoe. At this energy level, the adhesive was heated to a temperature of approximately 500 to 600° F. which is above the rupture temperature of the "Cycleweld" adhesive. The entire process of lining removal took about 3 minutes. Approximately the same results were obtained when the resistance element was embedded below the surface of the brake shoe instead of the brake shoe lining.

The foregoing parameters, of course vary with variations in the type of adhesive, wire size, resistance element, shape and bonding area.

The present novel bonding method provides a faster and more efficient means at less power requirement than hitherto known for converting electrical energy into heat immediately at the bonding area for bonding and/or debonding members to form a laminated structure.

This invention has been in part illustrated as adapted to the bonding and debonding of brake linings to brake shoes although it will be expressly understood that the invention is not so limited. In other applications, similar or dissimilar metals may be bonded otgether or ferrous metals to non-ferrous metals; friction material to metal; plastic to metal or wood to metal; wood and plastic to each other or one to the other. Other materials which readily lend themselves to bonding by the present novel method include glass, ceramic and other refractory materials.

In relatively soft or porous materials such as plastics, friction linings, glass, etc. the resistance element in the form of a wire network may be readily pressed into the surface, whereas in tougher materials, such as metal, grooves conforming to the network shape of the resistance element are cut, cast or otherwise formed in the surface to receive the wire resistance element. The grooves are preferably of a depth not exceeding the diameter of the wire element to have the heat source as close to the adhesive as possible to assure a rapid and efficient conversion of electrical energy into heat directly at the bonding area, but the grooves should not be shallower than the wire to provide a smooth surface. In any instance, the immediate bond area between the interfaces of the parts to be bonded is completely smooth and free of any interruptions by wire resistance elements which would destroy the intimate unity of the adhesive bond and thus provide numerous weak sections therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of bonding a friction lining member to a metal mounting member therefor, said members being preformed to have generally coextensive mounting surfaces of the same contour comprising recessing an electrical resistance heating element that is distinct from either of said members within and along said friction lining member closely adjacent the mounting surface thereof so that said element does not project out of said mounting surface, said heating element being disposed in an electrically insulating environment with respect to said members, providing a coextensive layer of thermo-setting non-metallic adhesive material between said members while holding said members together under pressure, and electrically energizing said element sufficiently to heat and cure said layer in situ and thereby form a uniform shear resistant bond of said material between said members at said surfaces.

2. A method of bonding a friction brake lining member to a rigid metal brake shoe member wherein the shoe member has an arcuate platform surface and the lining member has its inner surface formed to the same arcuate contour as said platform surface, comprising recessing an electrical resistance heating element that is distinct from either of said members within and along one of said members closely adjacent said surface thereof and so as not to project out of said surface, said heating element being disposed in an electrically insulating environment with respect to said members, providing a uniform thickness layer of thermo-setting non-metallic adhesive material between said members coextensively of said surfaces while holding the members together under pressure, and electrically energizing said element sufficiently to heat and cure said layer in situ and thereby form a uniform shear resistant bond of said material between said members at said surfaces.

3. In the method defined in claim 2, said material being of the type that becomes frangible when heated in excess of its curing temperature, and the further step of subsequently electrically energizing said element sufficiently to facilitate debonding of said members, as to strip a worn lining member from said shoe.

4. A brake shoe assembly comprising a metal shoe having a lining mounting platform formed with a relatively smooth arcuate surface, a friction brake lining member molded to shape on its outer brake drum engaging surface and having along its inner periphery an arcuate surface contoured coextensively with said shoe platform surface, a uniform thickness layer of heat curable bonding material disposed coextensively between said surfaces, and an electrical resistance heating element carried by said lining member closely adjacent to but effectively not projecting from said inner peripheral surface thereof and having terminals at opposite ends of the lining member for attachment of a source of electrical energy.

5. The brake shoe assembly defined in claim 4 wherein said electrical resistance heating element is a length of wire that extends back and forth laterally within said brake lining member below said arcuate surface thereof.

References Cited
UNITED STATES PATENTS

| | | | |
|---|---|---|---|
| 1,872,547 | 8/1932 | Weder | 188—250 |
| 1,960,120 | 5/1934 | Mohring. | |
| 1,972,439 | 9/1934 | Dresser | 156—275 X |
| 2,398,006 | 4/1946 | Hunt | 188—250 |
| 2,479,959 | 8/1949 | O'Neil | 156—275 |
| 2,531,782 | 11/1950 | Moore | 188—234 |
| 2,633,443 | 3/1953 | Langer | 156—275 |
| 2,675,051 | 4/1954 | Schnebelen | 156—584 |
| 2,711,984 | 6/1955 | Kingman | 156—344 |
| 2,742,390 | 4/1956 | Beck | 156—275 X |
| 2,956,606 | 10/1960 | Beck et al. | 156—275 X |
| 3,049,465 | 8/1962 | Wilkins | 156—275 |
| 3,061,503 | 11/1962 | Gould et al. | 156—275 |

FOREIGN PATENTS

| | | |
|---|---|---|
| 621,218 | 4/1949 | Great Britain. |

OTHER REFERENCES

Chemical Engineering, May 4, 1959, page 70 TNI.M45.

FERGUS S. MIDDLETON, *Primary Examiner.*

MILTON BUCHLER, *Examiner.*

G. E. HALVOSA, *Assistant Examiner.*